United States Patent [19]

Schneider et al.

[11] Patent Number: 5,432,520
[45] Date of Patent: Jul. 11, 1995

[54] SAR/GPS INERTIAL METHOD OF RANGE MEASUREMENT

[75] Inventors: Arthur J. Schneider, Pasadena; Richard J. Olerich, Saugus, both of Calif.

[73] Assignee: Hughes Aircraft Company, Los Angeles, Calif.

[21] Appl. No.: 137,523

[22] Filed: Oct. 18, 1993

[51] Int. Cl.⁶ .......................... G01S 5/02; G01S 13/00
[52] U.S. Cl. ...................................... 342/357; 342/25; 364/458
[58] Field of Search .................. 342/25, 357; 364/458, 364/444, 453

[56] References Cited

U.S. PATENT DOCUMENTS 4,613,867  9/1986  Golinsky ............................. 343/458
5,122,803  6/1992  Stann et al. ........................... 342/25

Primary Examiner—Thomas H. Tarcza
Assistant Examiner—Dao L. Phan
Attorney, Agent, or Firm—Charles D. Brown; Randall M. Heald; Wanda K. Denson-Low

[57] ABSTRACT

A method that provides precise target location measurement using a synthetic aperture radar (SAR) system jointly with a global positioning inertial navigation system (GPS/INS) located on a moving aircraft. The SAR system provides a precise measurement of the round trip elapsed radar wave propagation time from the aircraft location to a selected pixel in a ground map that includes a portion of the target. The velocity of radar wave propagation is measured at the same time that the range time lapse to the designated SAR map pixel is measured. When combined with position and velocity information derived from the GPS/INS inertial navigation system, the radar wave propagation time is used to calculate the position of the target pixel in GPS/INS coordinates, thereby improving measurement accuracy. The method comprises flying an aircraft containing GPS/INS and SAR systems along a predetermined flight path. The relative position and velocity of the aircraft along the flight path is accurately measured using the the global positioning system. A first SAR map is generated. A target pixel in the first SAR map that corresponds to the target is then designated. A minimum of two additional SAR maps are generated and the target pixel in each of the additional SAR maps is designated. The position of the target pixel relative to GPS/INS coordinates and the velocity of radar wave propagation to the target using aircraft position data derived from the global positioning system are then simultaneously measured. Finally, a more accurate position for the target pixel is calculated using the computed value for the radar wave propagation velocity.

6 Claims, 3 Drawing Sheets 0.01 PERCENT CASE 0.1 PERCENT CASE

SAR/GPS INERTIAL METHOD OF RANGE MEASUREMENT

BACKGROUND

The present invention relates generally to synthetic aperture radar (SAR) and global positioning inertial navigation systems (GPS/INS), and more particularly, to a method of providing range measurements that uses the SAR and GPS/INS systems to measure the velocity of radar wave propagation at the same time that the range time lapse to a designated map pixel is measured, thereby improving measurement accuracy.

A synthetic aperture radar is able to provide a precise measurement of the round trip elapsed radar wave propagation time from an aircraft location to a target location. The accuracy of this range measurement is affected by the accuracy to which the velocity of radar wave propagation in the atmosphere is known. Atmospheric conditions affect the radar wave propagation velocity to 0.03 percent and more. Since the prime use of the synthetic aperture radar system is to penetrate cloudy weather under variable atmospheric conditions, the accuracy of the radar wave propagation velocity measurement is an important factor. In measuring range to the target using the synthetic aperture radar system, the round trip propagation time (T) of the radar wave is measured and the range is calculated as CT/2, where C is the radar wave propagation velocity. The value of C can vary as a function of altitude, humidity, clouds, and other attributes of weather. At 50 nautical miles, error due to the atmosphere can be 100 feet or more.

Therefore, in view of the above, it is an objective of the present invention to provide for a range measurement method for use with a synthetic aperture radar system that improves target location accuracy.

SUMMARY OF THE INVENTION

The present invention is a method that provides precise target location measurement using a synthetic aperture radar (SAR) jointly with a global positioning inertial navigation system (GPS/INS) located on a moving aircraft. The synthetic aperture radar provides a precise measurement of the round trip elapsed radar wave propagation time from the aircraft location to a selected pixel in a ground map that includes a portion of the target. The velocity of radar wave propagation is measured after two range time lapses to the designated map pixel are measured. When combined with position and velocity information derived from the GPS/INS inertial navigation system, the radar wave propagation time is used to calculate the position of the target pixel in GPS/INS coordinates, thereby improving measurement accuracy.

More particularly, the present invention is a method comprising the following steps. An aircraft containing a global positioning system (GPS/INS) inertial navigation system and a synthetic aperture radar (SAR) system is flown along a predetermined flight path. A first synthetic aperture radar (SAR) map is then generated. A target pixel in the first SAR map that corresponds to a target is then designated. A minimum of one additional SAR map is generated and the same target is designated therein. The position of the target pixel relative to GPS/INS coordinates is then calculated and simultaneously the velocity of radar wave propagation to the target using aircraft position data derived from the global positioning system is measured. The final step is to use the computed value for the radar wave propagation velocity to compute a more accurate position for the target.

The key to the ability to measure wave propagation velocity in addition to target position (range and cross range) using two or more observations of the mapped area, is the accurate knowledge of aircraft position and velocity while the radar data is being recorded. The GPS/INS inertial navigation system is capable of measuring relative aircraft position to an accuracy of 3 to 5 feet. The GPS/INS inertial navigation system can measure aircraft velocity to an accuracy of 0.05 to 0. 1 feet per second. When taking synthetic aperture radar dam, the observations of the mapped area are made at an angle to the aircraft velocity vector, which changes while the aircraft flies by the target. Thus, the aircraft flies an accurately known baseline while taking measurements.

By using SAR and GPS/INS inertial navigation systems in the same aircraft, and taking a minimum of two measurements separated an angle of approximately 10 degrees or more with respect to the target in the SAR map, the range to the target, the frequency of the return signal, and the velocity of radar wave propagation are measured simultaneously, minimizing errors due to an unknown radar wave propagation velocity. This is a key step in the present method and improves upon conventional techniques that assume a value for the radar wave propagation velocity.

The accuracy of this calculation is affected by the accuracy to which the velocity of radar wave propagation in the atmosphere is known. The velocity of radar wave propagation is measured at the same time that the range time lapse to the designated map pixel is measured. This is important because atmospheric conditions affect the radar wave propagation velocity. Since the prime use of the synthetic aperture radar system is to penetrate cloudy weather under variable atmospheric conditions, use of the present method improves measurement accuracy.

In measuring range to the target using the synthetic aperture radar system, the round trip propagation time (T) of the radar wave is measured and the range is calculated as CT/2, where C is the radar wave propagation velocity. As was mentioned above, the value of C can vary as a function of altitude, humidity, clouds, and other attributes of weather. At 50 nautical miles, error due to the atmosphere can be 100 feet or more. The present method simultaneously makes use of information provided by the SAR and GPS/INS inertial navigation systems to measure the propagation velocity of the radar wave and reduces the error to 12 feet when the SAR resolution and GPS/INS relative accuracy are 5 feet.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
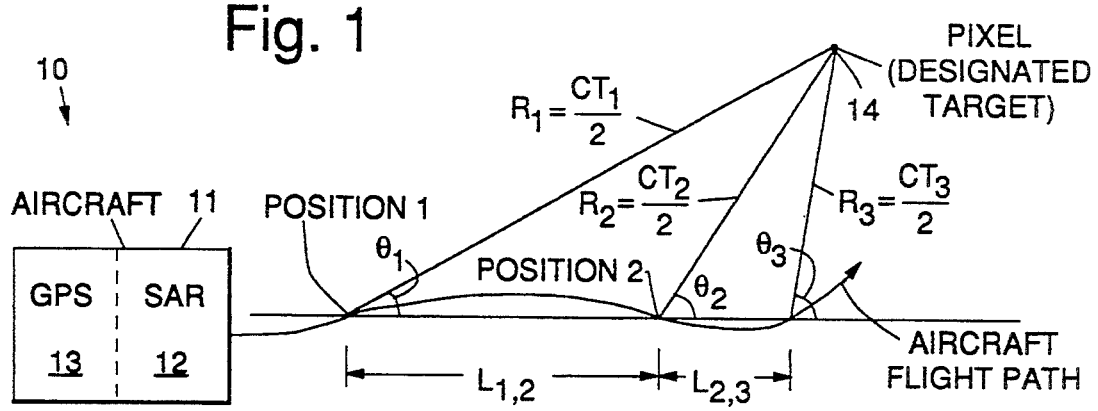
FIG. 1 illustrates the operational scenario in which a method in accordance with the principles of the present invention is employed.

Referring to the drawing figures, FIG. 1 illustrates the operational scenario in which a method 10 in accordance with the principles of the present invention is employed. The method 10 is implemented using an aircraft 11 containing a synthetic aperture radar (SAR) system 12 and a global positioning inertial navigation system (GPS/INS) 13. FIG. 1 shows the aircraft 11 navigating along a predetermined flight path 15 indicated by the curved arrowed line. The flight path 15 may be curved or straight and does not affect the operation of the present invention.

The synthetic aperture radar system 12 makes a series of SAR maps of the ground that include a target pixel 14 corresponding to a designated target 14. A minimum of two measurements of the target position are required to implement the present invention. The SAR maps are made at aircraft positions identified as positions 1, 2 and 3. Each position 1-3 is characterized by an angle $\theta_1$, $\theta_2$, and $\theta_3$, respectively. Each such angle differs from the adjacent angle by approximately 10 degrees or more. Outputs of each of the systems 12, 13 are processed using the present method 10 to produce a more accurate range measurement to the target 14 as will be discussed below.

The method 10 is implemented using the equations derived below. In these equations, V is the velocity of the aircraft 11, C is the velocity of radar wave propagation, $f_o$ is the radar frequency, df is the change in frequency (Doppler shift) received by the SAR system 12 from the target 14, L is the distance moved by the aircraft 11 between adjacent measurement positions (1, 2, and 3 shown in FIG. 1), T is the radar wave round trip travel time between the aircraft 11 and the target 14, and C is the speed of radar propagation. $L_{12}$ and $L_{23}$ are measured by the GPS/INS inertial navigation system 13 with an accuracy of from 3 to 5 feet. $T_1$, $T_2$, $T_3$ are measured by the synthetic aperture radar 12. The target 14 is selected by correlation of successive SAR maps.

A minimum of two measurements of the target position 14 are required to calculate the value of C. Additional maps and measurements may be used to improve accuracy as the baseline lengths ($L_{12}$, $L_{23}$) and the included angle ($\theta_i$) from the first SAR map to the last SAR map increases.

As shown in FIG. 1, the aircraft 11 containing the SAR and GPS/INS inertial navigation systems 12, 13 makes a minimum of three maps including the same target pixel 14 on the ground at positions 1, 2, and 3. In general, $df = (2\ V \cos\ \theta f_0)/C$, and therefore $\cos\ \theta = (df/f_0)(C/2\ V)$.

The baseline lengths L ($L_{12}$, $L_{23}$) may be measured to an accuracy of 3–5 feet by the GPS/INS inertial navigation system 13 at positions 1, 2, and 3 using four satellites (not shown) that are part of the GPS/INS system 13.

$$R_1 \cos\theta_1 - R_2 \cos\theta_2 = L_{12}, \text{ and}$$

$$\frac{CT_1}{2}\ \frac{df_1}{f_0}\ \frac{c}{2V_1} - \frac{CT_2}{2}\ \frac{df_2}{f_0}\ \frac{c}{2V_2} = L_{12},$$

where the subscripts indicate aircraft positions 1 and 2. Consequently, $$C = \frac{L_{12}}{\frac{T_1}{4f_0}\left(\frac{(df)_1}{v_1}\right) - \frac{T_2}{4f_0}\left(\frac{(df)_2}{v_2}\right)},$$

$R_1 = CT_1/2$ and
$R_2 = CT_2/2$.

All the quantities on the right hand sides of these last three equations are measured by the SAR and GPS/INS systems 12, 13. Consequently the two target range measurement distances R1 and R2 are calculated using the last three equations, and provide range values that more accurately predict where the target 14 is located. For example, if L is 100,000 ft (16.25 Nautical miles) L is known to 4.5 ft or 0.0045%, whereas the change in the propagation velocity is about 0.03% or 30 ft in 100,000 ft, under standard atmospheric conditions.

At 50 nautical miles, error due to the atmosphere can be 100 feet or more. The present method 10 simultaneously makes use of information provided by the SAR and GPS/INS inertial navigation systems 12, 13 to measure the propagation velocity of the radar wave and thus reduces the error to 12 feet when the SAR resolution and GPS/INS relative accuracy are 5 feet.

Figure 2:
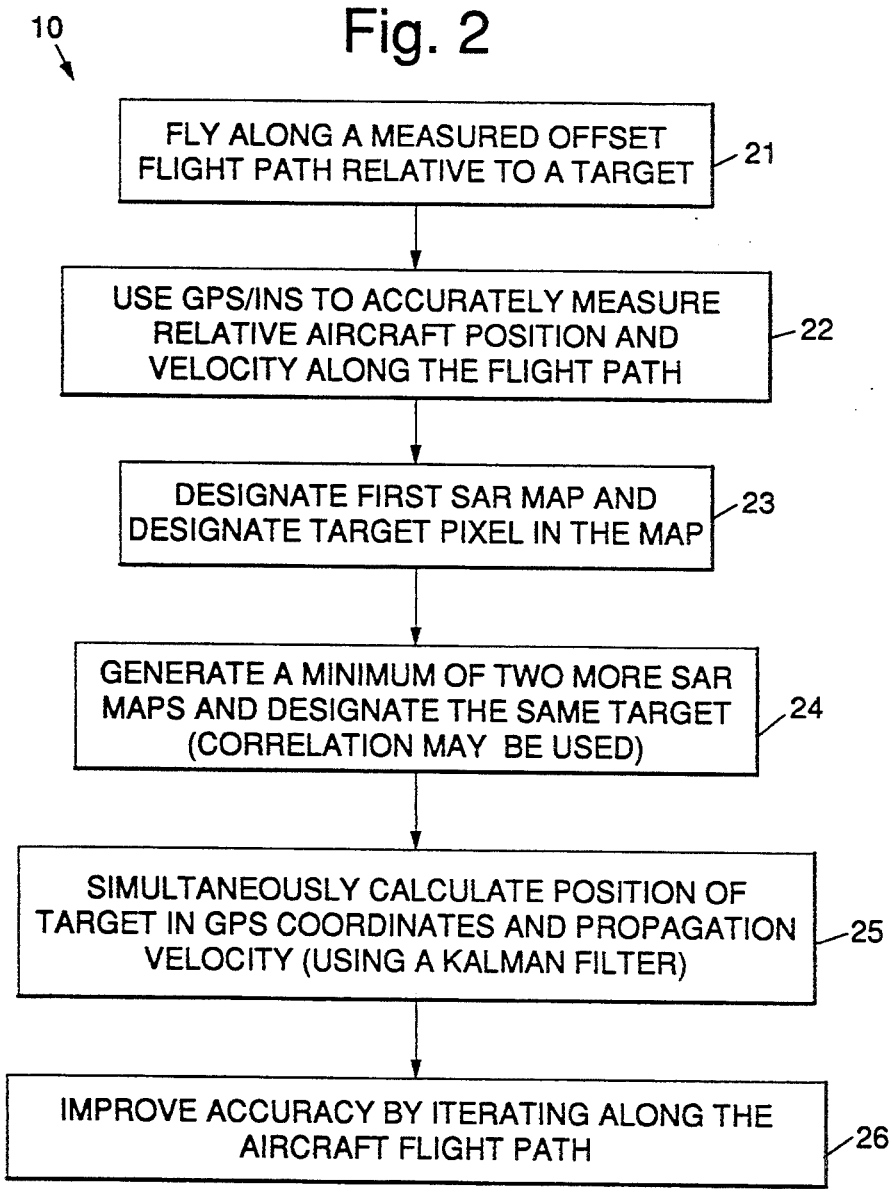
FIG. 2 shows a flow diagram illustrating the method in accordance with the principles of the present invention.

FIG. 2 shows a flow diagram illustrating the method 10 in accordance with the principles of the present invention. The method 10 comprises the following steps. The first step is to fly an aircraft along the predetermined flight path 15 relative to a target 14, as is indicated by step 21. The flight path need not be straight, and may be serpentine as illustrated by the curved arrowed line in FIG. 1. The next step is to use the global positioning system 13 to accurately measure the relative position and velocity of the aircraft 11 along the flight path 15, as is indicated in step 22.

The next step is to generate a first SAR map and to designate a target pixel 14 in the SAR map, as indicated by step 23. This is typically performed by a radar operator. The next step is to generate a minimum of two more SAR maps and designate the same target pixel 14 in the SAR maps, as is indicated by step 24. Correlation may be used to designate the same target in the additional SAR maps. The next step is to simultaneously calculate the position of the target pixel 14 in GPS/INS coordinates and measure the velocity of the radar wave propagation (C), as is indicated by step 25. This is performed using a Kalman filter adapted to perform this function. The calculations are based upon accurate aircraft position data derived from the GPS/INS system 13. Sampling multiple position and velocity measurements and calculating values for the velocity measurement are key steps in the present method 10 and improves upon conventional techniques that assume a value for the radar wave propagation velocity.

The final step is to use the computed value for the radar wave propagation velocity to compute a more accurate position of the target pixel, and hence the target 14, as is indicated by step 26. In essence, improved accuracy is achieved by iterating along the aircraft flight path 15. Thus the present method more accurately defines the target pixel location and overcomes variability due to the effects of weather.

A simulation was performed that implemented the method 10 of the present invention and wherein the target is identified by a range/doppler pixel 14 and the propagation velocity is included as a state in a Kalman filter. The aircraft 11 flew past the target (target pixel 14) at a constant velocity, with the GPS/INS inertial navigation system 13 measuring its position within 5 feet and its velocity within 0.05 ft/sec. The results of this simulation show a target position uncertainty of 11.4 ft.×8.9 ft. with a propagation velocity uncertainty of approximately 5 parts per million. By comparison, if the propagation velocity were known exactly, the error would by 9.5 ft.×3.6 ft., and if the uncertainty in the propagation velocity were 0.1 percent the position uncertainty is 49 ft.×32 ft.

Figure 3:
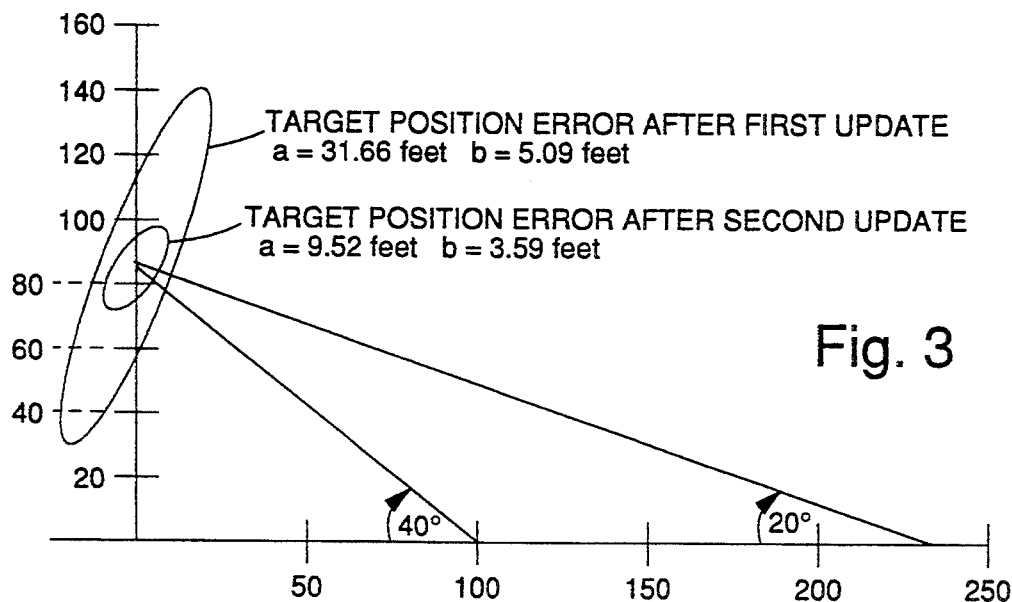
FIG. 3 illustrates a graph showing target position error after first and second updates when there is no uncertainty in the speed of light.
Figure 4:
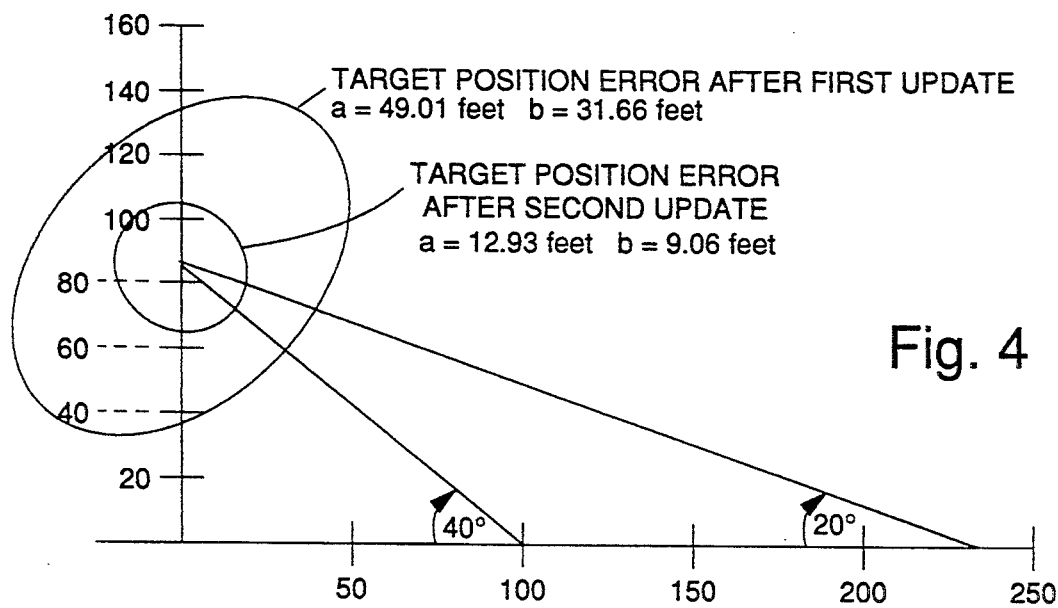
FIG. 4 illustrates a graph showing target position error after first and second updates when there is an uncertainty in the speed of light of 0.1 percent.
Figure 5:
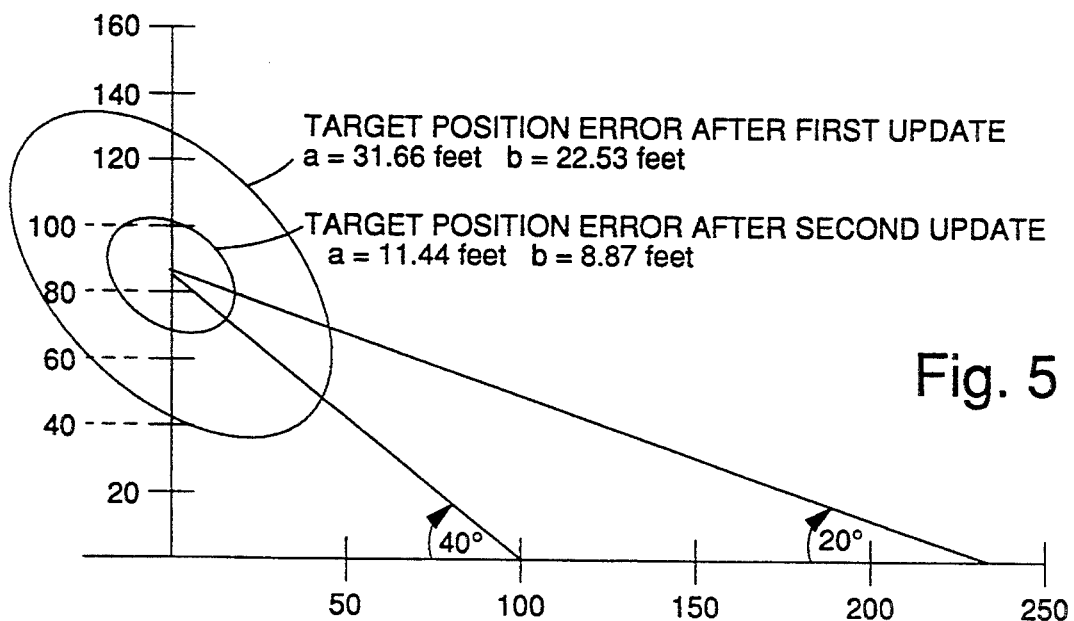
FIG. 5 illustrates a graph showing target position error after first and second updates when there is an uncertainty in the speed of light of 0.01 percent that is achieved using the method of the present invention.
Figure 6A:
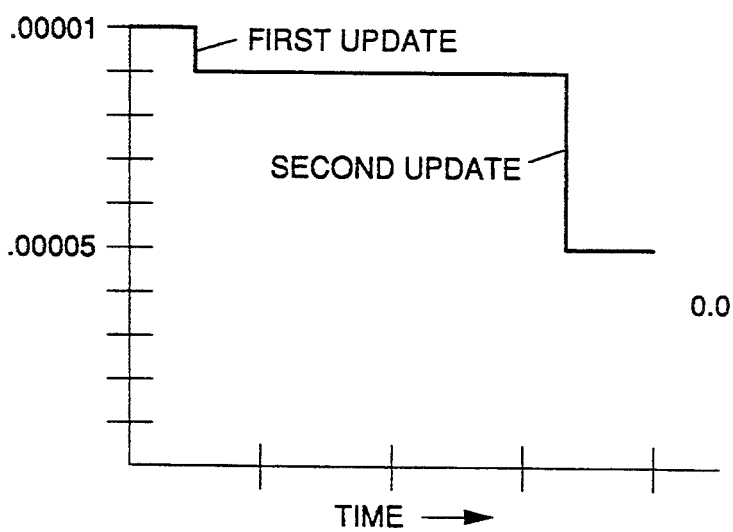
FIG. 6a illustrates a graph showing the error in the estimated speed of light for the 0.01 percent case.
Figure 6B:
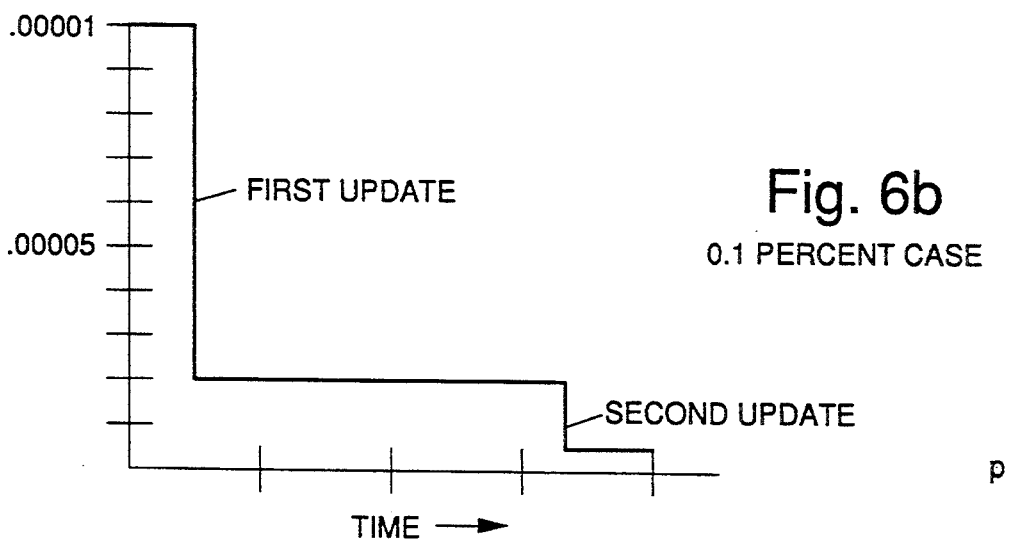
FIG. 6b illustrates a graph showing the error in the estimated speed of light for the 0.1 percent case.

For the purposes of comparison, the range measurement accuracy provided by the present method 10 will be illustrated with reference to FIGS. 3–6. FIG. 3 illustrates a graph showing target position error after first and second updates at positions 1 and 2 when there is no uncertainty in the speed of light. FIG. 4 illustrates a graph showing target position error after first and second updates at positions 1 and 2 when there is an uncertainty in the speed of light of 0.1 percent. FIG. 5 illustrates a graph showing target position error after first and second updates at positions 1 and 2 when there is an uncertainty in the speed of light of 0.01 percent that is achieved using the method of the present invention. FIG. 6a illustrates a graph showing the error in the estimated speed of light for the 0.01 percent case shown in FIG. 5. FIG. 6b illustrates a graph showing the error in the estimated speed of light for the 0.1 percent case shown in FIG. 4.

From FIGS. 3–6 it can be appreciated that the present method 10 provides for a more accurate range measurement to the target 14 from the aircraft 11. In particular, after taking two measurements separated by 10 degrees or more, the measurement accuracy (target position error) is improved using the method 10 of the present invention.

Thus there has been described a new and improved method of providing range measurements that uses the SAR and GPS/INS systems to measure the velocity of radar wave propagation at the same time that the range time lapse to a designated map pixel is measured, and thereby improve measurement accuracy. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A method of more accurately determining range to a target from a moving aircraft containing a global positioning system (GPS/INS) inertial navigation system and a synthetic aperture radar (SAR) system, said method comprising the steps of:

flying the aircraft along a predetermined flight path;
   accurately measure the relative position and velocity of the aircraft along the flight path using the the global positioning system with an inertial navigation system;
   generating a first synthetic aperture radar (SAR) map;
   designating a target pixel in the first SAR map that corresponds to a target;
   generating a minimum of one additional SAR map and designating the target pixel in each of the additional SAR map;
   simultaneously calculating the position of the target pixel relative to the position of the aircraft in GPS/INS coordinates and measuring the velocity of radar wave propagation to the target using aircraft position data derived from the global positioning system; and
   computing a more accurate position for the target pixel using the computed value for the radar wave propagation velocity.

2. The method of claim 1 wherein the step of generating a minimum of two SAR maps comprises correlating the relative positions of the target pixels in each of the SAR maps.

3. The method of claim 1 wherein the step of calculating an accurate value for the radar wave propagation velocity at two successive positions uses the equations $$C = \frac{L_{12}}{\frac{T_1}{4f_0}\left(\frac{(df)_1}{v_1}\right) - \frac{T_2}{4f_0}\left(\frac{(df)_2}{v_2}\right)},$$

$R_1 = CT_1/2$ and
$R_2 = CT_2/2$, where $V_1$ is the velocity of the aircraft at a first measurement position, $V_2$ is the velocity of the aircraft at a second measurement position, C is the velocity of radar wave propagation, $f_o$ is the radar frequency, df is the change in frequency received by the SAR system from the target, $L_{12}$ is the distance moved by the aircraft between the first and second measurement positions, $T_1$ and $T_2$ are radar wave round trip travel times between the aircraft and the target at the first and second measurement positions.

4. A method of more accurately determining range to a target from a moving aircraft, said method comprising the steps of:

disposing a global positioning system (GPS/INS) inertial navigation system and a synthetic aperture radar (SAR) system on an aircraft;
   flying the aircraft along a predetermined flight path;
   accurately measuring the relative position and velocity of the aircraft along the flight path using the the global positioning system;
   generating a first synthetic aperture radar (SAR) map;
   designating a target pixel in the first SAR map that corresponds to a target;
   generating a minimum of one additional SAR map and designating the target pixel in each of the additional SAR map;
   simultaneously calculating the position of the target pixel relative to GPS/INS coordinates and measuring the velocity of radar wave propagation to the target using aircraft position data derived from the global positioning system; and computing a more accurate position for the target pixel using the computed value for the radar wave propagation velocity.

5. The method of claim 4 wherein the step of generating a minimum of one additional SAR maps comprises correlating the relative positions of the target pixels in each of the SAR maps.

6. The method of claim 4 wherein the step of calculating an accurate value for the radar wave propagation velocity at two successive positions uses the equations $$C = \frac{L_{12}}{\frac{T_1}{4f_0}\left(\frac{(df)_1}{v_1}\right) - \frac{T_2}{4f_0}\left(\frac{(df)_2}{v_2}\right)},$$

$R_1 = CT_1/2$ and
$R_2 = CT_2/2$, where $V_1$ is the velocity of the aircraft at the first measurement position, $V_2$ is the velocity of the aircraft at the second measurement position, C is the velocity of radar wave propagation, $f_o$ is the radar frequency, df is the change in frequency received by the SAR system from the target, $L_{12}$ is the distance moved by the aircraft between the first and second measurement positions, $T_1$ and $T_2$ are radar wave round trip travel times between the aircraft and the target at the first and second measurement positions.

* * * * *